United States Patent [19]

Ott et al.

[11] Patent Number: 5,589,049
[45] Date of Patent: Dec. 31, 1996

[54] METHOD OF COATING ELECTRICALLY CONDUCTIVE SUBSTRATES, AQUEOUS ELECTRODIP PAINTS, PROCESS FOR THE PREPARATION OF AN AQUEOUS DISPERSION OF CROSSLINKED POLYMER MICROPARTICLES AND DISPERSIONS PREPARED BY THIS PROCESS

[75] Inventors: Günther Ott; Hardy Reuter; Walter Jouck; Susanne Piontek; Ulrich Heimann, all of Münster, Germany; John Gilbert, Beverly Hills, Mich.

[73] Assignee: BASF Lacke +Farben, AG, Muenster-Hiltrup, Germany

[21] Appl. No.: 284,406

[22] PCT Filed: Feb. 8, 1993

[86] PCT No.: PCT/EP93/00291

§ 371 Date: Aug. 22, 1994

§ 102(e) Date: Aug. 22, 1994

[87] PCT Pub. No.: WO93/16139

PCT Pub. Date: Aug. 19, 1993

[30] Foreign Application Priority Data

Feb. 15, 1992 [DE] Germany .................. 42 04 581.9

[51] Int. Cl.$^6$ .................................................. C25D 13/04
[52] U.S. Cl. ..................... 204/504; 204/506; 204/501; 523/414; 523/420
[58] Field of Search ..................... 204/181.7, 181.4; 523/414, 420; 205/109, 224

[56] References Cited

U.S. PATENT DOCUMENTS

| 4,781,808 | 11/1988 | Geist et al. | 204/181.7 |
| 5,135,970 | 8/1992 | Honel et al. | 523/414 |

FOREIGN PATENT DOCUMENTS

| 0296494 | 6/1988 | European Pat. Off. . |
| 136189 | 9/1989 | European Pat. Off. . |

Primary Examiner—Bruce F. Bell
Assistant Examiner—Kishor Mayekar
Attorney, Agent, or Firm—Anne Gerry Sabourin

[57] ABSTRACT

The invention relates to a method of of coating electrically conductive substrates using cathodically depositable electrodip paints. The invention is notable in that the electrodip paints employed contain crosslinked polymer microparticles which can be prepared by reacting (A) a compound which contains on average more than 1.0 epoxide groups per molecule, or a mixture of such compounds, and (B) a compound which contains not only a group reactive toward epoxide groups but also at least one ketimine or aldimine group in the molecule, or a mixture of such compounds
to give a noncrosslinked intermediate product (C), which still contains on average at least one epoxide group per molecule, and dispersing this intermediate product in the presence of a Brönsted acid in an aqueous medium.

16 Claims, No Drawings

METHOD OF COATING ELECTRICALLY CONDUCTIVE SUBSTRATES, AQUEOUS ELECTRODIP PAINTS, PROCESS FOR THE PREPARATION OF AN AQUEOUS DISPERSION OF CROSSLINKED POLYMER MICROPARTICLES AND DISPERSIONS PREPARED BY THIS PROCESS

This application is a 371 of PCT/EP93/00291 filed Feb. 8, 1993, and published as WO93/16139 Aug. 19, 1993.

BACKGROUND OF THE INVENTION

1. Field of the Invention

The invention relates to a method of coating electrically conductive substrates, in which
(1) the electrically conductive substrate is immersed in an aqueous electrodip paint which contains at east one cathodically depositable synthetic resin and crosslinked polymer microparticles,
(2) the substrate is connected as cathode,
(3) a film is deposited by direct current on the substrate,
(4) the coated substrate is removed from the electrodip paint and
(5) the deposited paint film is baked.

The invention also relates to aqueous electrodip paints, a process for the preparation of an aqueous dispersion of crosslinked polymer microparticles and dispersions prepared by this process.

2. Description of the Prior Art

The above-described cathodic electrodip coating method is known (cf. e.g. Glasurit-Handbuch Lacke und Farben, Curt R. Vincentz Verlag, Hanover 1984, pp. 374–384 and pp. 457–462) and has become established as a method for the automatic coating of large items such as wheels and, in particular car bodies.

EP-A 259,181 discloses a cathodic electrodip coating method in which electrodip paints are employed containing polymer microparticles which have a softening point at least 10° C. above the bath temperature, a solubility parameter which differs by not more than 1.0 from the solubility parameter of the cathodically depositable synthetic resin, a refractive index which differs by 0.02 to 0.3 from the refractive index of the cathodically depositable synthetic resin, or have a crosslinking density of 0.01 to 5.05 mmol/g. The polymer microparticles employed are products prepared by polymerization of ethylenically unsaturated compounds. The polymer microparticles employed are intended in particular to improve edge covering.

EP-A-433,783 discloses a cathodic electrodip coating method in which electrodip paints are employed containing polymer microparticles comprising crosslinked urea-aldehyde, triazine-aldehyde or phenol-aldehyde resins or polymer particles of noncrosslinked (meth)acrylonitrile homo- or copolymers. In this case too the polymer microparticles employed are intended to improve edge covering.

The addition of the polymer microparticles described in EP-A 259,181 and EP-A-433,783 to electrodip paints leads in many cases to improvements in the edge covering. Despite the improved edge covering, the corrosion protection effect of the deposited electrodip coating films on the edge is inadequate. In addition, the addition of the polymer microparticles described in EP-A-259,181 and EP-A-433,783 has resulted in many cases, disadvantageously, in the occurrence of sedimentation in the electrodip paint, a worsening in adhesion to the substrate and/or to oversprayed coating layers, a sharp deterioration in the levelling and a reduction in the corrosion protection effect of the deposited electrodip coating films.

The present invention is based on the object of providing an improved cathodic electrodip coating method. In particular, this improved electrodip coating method should enable the production of coating films which cover the edges of the coated substrate well and which display at least some of the above-described disadvantages of the state of the art to a lesser extent or not at all.

This object is, surprisingly, achieved by a cathodic electrodip coating method of the type described above, which is characterized in that the crosslinked polymer microparticles contained in the aqueous electrodip paint can be prepared by reacting
(A) a compound which contains on average more than 1.0 epoxide group per molecule, or a mixture of such compounds, and
(B) a compound which contains not only a group reactive toward epoxide groups but also at least one ketimine or aldimine group in the molecule, or a mixture of such compounds
to give a noncrosslinked intermediate product (C), which still contains on average at least one epoxide group per molecule, and dispersing this intermediate product in the presence of a Brönsted acid in an aqueous medium.

U.S. Pat. No. 4,017,438 describes noncrosslinked products of the reaction of polyepoxides and polyamine derivatives containing a secondary amino group and at least one ketimine group. These reaction products are employed as binders in electrodip paints. They do not bring about any improvement in the edge covering.

EP-A-351,141 describes crosslinked polymer microparticles which can also be employed in cathodically depositable electrodip paints. The polymer microparticles are prepared by dispersing a synthetic resin, which contains both hydrophilic groups and groups which make autocrosslinking possible, in an aqueous medium and then carrying out crosslinking of the dispersed polymer microparticles. The polymer microparticles employed in accordance with the invention are not described. In addition, the object on which the present invention is based is not addressed in EP-A-351,141. The incorporation of the polymer microparticles described in EP-A-351,141 in cathodically depositable electrodip paints leads to similar problems as with the addition of the polymer microparticles described in EP-A-259,181 and EP-A-433,783.

EP-A-421,238 describes crosslinked polymer microparticles which are prepared by reacting compounds containing epoxide groups with polyamines; the functionality of the compound containing epoxide groups should be greater than one and the functionality of the polyamines greater than two. The polymer microparticles employed in accordance with the invention are not described. The crosslinked polymer microparticles described in EP-A-421,238 are intended to be employed as a substitute for white pigments, in particular titanium dioxide. The object on which the present invention is based is not addressed in EP-A-421,238. The incorporation of the polymer microparticles described in EP-A-421, 238 in cathodically depositable electrodip paints leads to similar problems as with the addition of the polymer microparticles described in EP-A-259,181 and EP-A-433,783.

SUMMARY OF THE INVENTION

The preparation of the polymer microparticles employed in accordance with the invention is simple and can be achieved without problems. In a first step, components (A)

and (B) are reacted to give a noncrosslinked intermediate product (C) which still contains on average at least one epoxide group per molecule. This reaction can be carried out in bulk or, preferably, in organic solvents such as aromatic compounds, alcohols, ketones, ethers, aliphatic compounds and mixtures thereof. In a second step, the noncrosslinked intermediate product thus obtained is dispersed in an aqueous medium in the presence of a Brönsted acid such as acetic acid, lactic acid or formic acid. The crosslinking of the particles is carried out by reacting the primary amino groups, which are exposed after breaking the ketimine groups, with the epoxide groups. This reaction proceeds at a satisfactory rate even at room temperature. It can of course be accelerated by raising the temperature. The term an aqueous medium refers to water which in addition may also contain organic solvents.

DESCRIPTION OF THE PREFERRED EMBODIMENTS

As component (A), in principle any compound which contains on average more than 1.0 epoxide group per molecule, or a mixture of such compounds, can be employed.

It is preferred to employ as component (A) compounds which contain on average 1.5 to 3.0 epoxide groups per molecule.

Examples of (A) components which can be employed are polyglycidyl ethers which can be prepared from polyphenols and epihalohydrins, in particular diglycidyl ethers of polyphenols. A particularly preferred polyphenol is bisphenol A. Further suitable polyphenols are bisphenol F, 1,1-bis(4-hydroxyphenyl)ethane, 1,1-bis(4-hydroxyphenyl)isobutane, bis(-2-hydroxynaphthyl)methane and 1,5 dihydroxynaphthalene.

As (A)-component it is also possible to employ polyglycidyl ethers of aliphatic or cycloaliphatic polyols such as polyether-polyols (polymethylene oxide, polyethylene oxide, polypropylene oxide, poly(ethylene oxide-co-propylene oxide [sic], and polytetramethylene oxide), ethylene glycol, diethylene glycol, triethylene glycol, 1,2-propylene glycol, 1,4-propylene glycol, dipropylene glycol, tripropylene glycol, pentanediol, hexanetriol, glycerol and 2,2-bis(4-hydroxycyclohexyl-)propane.

It is also possible to employ polyglycidyl esters of polycarboxylic acids such as oxalic acid, succinic acid, glutaric acid, terephthalic acid, 2,6-naphthalenedicarboxylic acid and dimerized linoleic acid as component (A). Typical examples are glycidyl adipate and glycidyl phthalate.

Additionally suitable as component (A) are polyglycidyl ethers of phenolic novolak resins, hydantoin epoxides and polyepoxide compounds which are obtained by epoxidation of an olefinically unsaturated compound.

It is also possible to employ as (A)-component compounds which can be prepared by reacting compounds containing epoxide groups with modifying compounds. In this case, however, it should always be ensured that the compound employed as (A)-component contains on average more than 1.0 epoxide group per molecule.

Specific examples of modifying compounds are:
a) compounds containing carboxyl groups, such as saturated or unsaturated monocarboxylic acids (e.g. benzoic acid, linseed oil fatty acid, 2-ethylhexanoic acid, Versatic acid), aliphatic, cycloaliphatic and/or aromatic dicarboxylic acids of various chain lengths (e.g. adipic acid, 2,2-dimethylmalonic acid, sebacic acid, hexahydrophthalic acid, isophthalic acid or dimeric fatty acids), hydroxyalkylcarboxylic acids (e.g. lactic acid, dimethylolpropionic acid) and polyesters containing carboxyl groups, or
b) compounds containing amino groups, such as diethylamine or ethylhexylamine or diamines containing secondary amino groups, e.g. N,N'-dialkylalkylenediamines, such as dimethylethylenediamine, N,N'-dialkylpolyoxyalkyleneamines, such as N,N'-dimethylpolyoxypropylenediamine, cyano-alkylated alkylenediamines, such as N,N'-biscyanoethylethylenediamine, cyanoalkylated polyoxyalkyleneamines, such as N,N'-biscyanoethylpolyoxypropylenediamine, polyamino-amides, such as Versamides, in particular reaction products of diamines (e.g. hexamethylenediamine), containing terminal amino groups, polycarboxylic acids, in particular dimeric fatty acids, and monocarboxylic acids, in particular fatty acids or the reaction product of one mole of diaminohexane with two moles of monoglycidyl ether or monoglycidyl ester, specifically glycidyl esters of α-branched fatty acids such as Versatic acid, or
c) compounds containing hydroxyl groups, such as bisphenol A, neopentyl glycol, bisethoxylated neopentyl glycol, the neopentyl glycol ester of hydroxypivalic acid, dimethylhydantoin-N,N'-diethanol, hexane-1,6-diol, hexane-2,5-diol, 1,4-bis(hydroxymethyl)cyclohexane, trimethylolpropane, pentaerythritol or amino alcohols such as triethanolamine, or methyldiethanolamine, and also polyglycol ethers, polyester-polyols, polyetherpolyols, polycaprolactone-polyols and polycaprolactam-polyols of various functionality and molecular weights, or
d) saturated or unsaturated fatty acid methyl esters, which are transesterified in the presence of sodium methylate with hydroxyl groups of the epoxy resins.

As (A)-component it is preferred to employ compounds containing epoxide groups, which are obtainable by reacting a compound (α) containing epoxide groups with a compound (β) which reacts monofunctionally with epoxide groups, in a molar ratio such that the (A)-component obtained contains on average more than 1.0 epoxide group, preferably 1.5 to 3.0 epoxide groups per molecule, (α) being an epoxide group-containing compound which contains on average more than 1.5 epoxide groups, preferably more than 1.8 epoxide groups per molecule, or a mixture of such compounds, and (β) being a compound which contains an alcoholic OH group, a phenolic OH group or an SH group in the molecule, or a mixture of such compounds.

The reaction between α and β can be carried out either in bulk or in an organic solvent or a mixture of organic solvents. As a rule it is expedient to carry out the reaction at elevated temperatures, for example 100° to 195° C. If the reaction is carried out in the presence of catalysts, for example tertiary amines, a reaction may also occur between the secondary hydroxyl groups formed by the opening of epoxide rings and epoxide groups (products of such reactions are described in DE-A-3,518,770 and DE-A-3,518,732). In such cases it may be necessary to terminate the reaction, for example by lowering the temperature and/or by deactivating the catalyst, before the reaction product reaches too high a viscosity or before a crosslinked reaction product is obtained.

Examples of compounds (α) containing epoxide groups which can be employed are polyglycidyl ethers which can be prepared from polyphenols and epihalohydrins, in particular diglycidyl ethers of polyphenols. A particularly preferred polyphenol is bisphenol A. Further suitable polyphenols are bisphenol F, 1,1-bis(4-hydroxyphenyl)ethane, 1,1-bis(4-hydroxyphenyl)isobutane, bis(2-hydroxynaphthyl)methane and 1,5 dihydroxynaphthalene.

It is also possible to employ polyglycidyl ethers of aliphatic or cycloaliphatic polyols such as polyether-polyols (polymethylene oxide, polyethylene oxide, polypropylene oxide, polyethylene oxide-co-propylene oxide, polytetramethylene oxide), ethylene glycol, diethylene glycol, triethylene glycol, 1,2-propylene glycol, 1,4-propylene glycol, dipropylene glycol, tripropylene glycol, pentanediol, hexanetriol, glycerol and 2,2-bis(4-hydroxycyclohexyl-)propane as compounds (α) containing epoxide groups.

It is also possible to employ polyglycidyl esters of polycarboxylic acids such as oxalic acid, succinic acid, glutaric acid, terephthalic acid, 2,6-naphthalenedicarboxylic acid and dimerized linoleic acid as compounds (α) containing epoxide groups. Typical examples are glycidyl adipate and glycidyl phthalate.

Additionally suitable as compounds (α) containing epoxide groups are polyglycidyl ethers of phenolic novolak resins, hydantoin epoxides and polyepoxide compounds which are obtained by epoxidation of an olefinically unsaturated compounds [sic].

As compound (β) which reacts monofunctionally with epoxide groups, it is preferred to employ compounds having a phenolic OH group, particularly preferably alkylphenols, such as o-cresol, m-cresol, p-cresol, t-butylphenol, nonylphenol, dodecylphenol and pentadecenylphenol.

As component (B), in principle any compound which contains both a group which is reactive toward epoxide groups and at least one ketimine or aldimine group in the molecule, or a mixture of such compounds, can be employed.

The compounds which can be employed as component (B) are obtainable by reacting compounds (D), which contain both a group which is reactive toward epoxide groups and at least one primary amino group in the molecule, with a ketone, such as acetone, methyl ethyl ketone or methyl isobutyl ketone, or an aldehyde, preferably with a ketone, to give the ketimine or aldimine group-containing component (B). This reaction is preferably carried out in an organic solvent, such as xylene, toluene or n-hexane, at elevated temperature. The water of reaction is usually removed by azeotropic distillation.

Examples of components (D) which can be employed are compounds containing not only a hydroxyl group, a mercapto group or a secondary amino group and at least one primary amino group in the molecule, such as ethanolamine, mercaptoethanolamine, diethylenetriamine, dipropylenetriamine, dibutylenetriamine, N-aminoethylpiperazine etc. (cf. also the compounds mentioned in U.S. Pat. No. 4,017,438).

As component (B), it is preferred to employ compounds which contain both a secondary amino group and at least one ketimine or aldimine group in the molecule. Diethylenetriamine as component (D) is employed with particular preference.

Components (A) and (B) must be reacted with one another in a stoichiometric ratio such that the noncrosslinked intermediate product (C) still contains on average at least one epoxide group per molecule; that is, component (B) must be employed in an amount such that, of the epoxide groups contained in component (A), only so many can be reacted with the groups which are reactive toward epoxide groups and are contained in component (B) for the noncrosslinked intermediate product (C) formed from (A) and (B) still to contain on average at least one epoxide group per molecule. It is preferred to react components (A) and (B) with one another in a stoichiometric ratio such that the intermediate product (C) still contains on average 1.0 to 4.0 epoxide groups, preferably 1.0 to 2.0 epoxide groups, per molecule; that is, it is preferred to employ component (B) in an amount such that, of the epoxide groups contained in component (A), only so many can be reacted with the groups which are reactive toward epoxide groups and are contained in component (B) for the noncrosslinked intermediate product (C) formed from (A) and (B) still to contain on average 1.0 to 4.0 epoxide groups, preferably 1.0 to 2.0 epoxide groups per molecule.

To prepare the crosslinked polymer microparticles employed in accordance with the invention, the noncrosslinked intermediate product (C) is dispersed in an aqueous medium in the presence of a Brönsted acid. The Brönsted acid may be added either to the intermediate product (C) or to the aqueous medium. The presence of the Brönsted acid leads to a protonation of at least some of the amino groups contained in the end product. The protonated amino groups stabilize the aqueous dispersion of polymer microparticles.

The aqueous electrodip paints which can be employed in the method according to the invention also contain, in addition to the crosslinked polymer microparticles employed in accordance with the invention, at least one cathodically depositable synthetic resin as binder and, optionally, at least one crosslinking agent, pigments, organic solvents and conventional additives.

The electrodip paints employed in accordance with the invention can in principle contain any cathodically depositable synthetic resin. The cathodically depositable synthetic resin is preferably noncrosslinked.

The electrodip paints employed in accordance with the invention preferably contain amine-modified epoxy resins as cathodically depositable synthetic resins.

Amine-modified epoxy resins are known (cf. e.g. U.S. Pat. Nos. 3,922,253, 4,031,050, and 4,101,486, DE-A-3,518,770, DE-A-3,518,732, U.S. Pat. No. 4,017,438, DE-A-2,7010,02 and EP-B-4090) and can be prepared by reacting the above-described component (A) with a component (E).

As component (E), primary and/or secondary amines or their salts and/or salts of tertiary amines may be used, the secondary amines being particularly preferred (E)-components.

The amine should preferably be a water-soluble compound. Examples of such amines are mono- and dialkylamines, such as methylamine, ethylamine, propylamine, butylamine, dimethylamine, diethylamine, dipropylamine, methylbutylamine and the like. Also suitable are alkanolamines, such as methylethanolamine, diethanolamine and the like. Dialkylaminoalkylamines, such as dimethylaminoethylamine, diethylaminopropylamine, dimethylaminopropylamine and the like are also suitable. In most cases low molecular weight amines are used, but it is also possible to use monoamines of higher molecular weight.

Polyamines containing primary and secondary amino groups can be reacted in the form of their ketimines with the epoxide groups. The ketimines are prepared from the polyamines and ketones in a known manner.

In addition, the amines may also contain other groups, but these should not interfere with the reaction of the amine with the epoxide group and should also not lead to gellation of the reaction mixture.

The negative charges necessary for water-dilutability and electrodip may be produced by protonation with water-soluble acids (e.g. boric acid, formic acid, lactic acid, and preferably acetic acid) or else by reacting the oxiran groups with salts of an amine.

As the salt of an amine, the salt of a tertiary amine may be used.

The amine moiety of the amine acid salt is an amine which may be unsubstituted or substituted as in the case of hydroxylamine; these substituents should not interfere with the reaction of the amine acid salt with the polyepoxide and should not gel the reaction mixture. Preferred amines are tertiary amines such as dimethylethanolamine, triethylamine, trimethylamine, triisopropylamine and the like. Examples of other suitable amines are those given in U.S. Pat. No. 3,839,252 in column 5, line 3 to column 7, line 42.

By reaction with partially blocked polyisocyanates, the amine-modified epoxy resins can be converted into autocrosslinking synthetic resins.

Preferred electrodip paints are electrodip paints which contain as amine-modified epoxy resins reaction products of components (A) and (E), with component (A) being able to be prepared by reaction of
(i) a diepoxide compound or a mixture of diepoxide compounds having an epoxide equivalent weight of below 2000 with
(ii) a compound which reacts monofunctionally with epoxide groups under the given reaction conditions and contains a phenol or thiol group, or a mixture of such compounds, components (i) and iii) being employed in a molar ratio of from 10:1 to 1:1, preferably 4:1 to 1.5:1, and the reaction of component (i) with the component (ii) being carried out at 100° to 190° C. optionally in the presence of a catalyst (cf. DE-A-35 18 770).

Likewise preferred as electrodip paints are electrodip paints which contain as amine-modified epoxy resins reaction products of components (A) and (E), with component (A) being able to be prepared by the polyaddition of a diepoxide compound and/or a mixture of diepoxide compounds, optionally together with at least one monoepoxide compound, this reaction being carried out at 100° to 195° C. optionally in the presence of a catalyst and being initiated by a monofunctionally reacting initiator which carries either an alcoholic OH group, a phenolic OH group or an SH group, to give an epoxy resin in which diepoxide compound and initiator are incorporated in a molar ratio of more than 2:1 to 10:1 (cf. DE-A-3,518,732).

The electrodip paints employed in accordance with the invention preferably contain at least one crosslinking agent and/or at least one autocrosslinking cathodically depositable synthetic resin.

As crosslinking agent, the electrodip paints employed in accordance with the invention preferably contain at least one blocked polyisocyanate.

As blocked polyisocyanates it is possible to employ conventional aliphatic, cycloaliphatic or aromatic di- or polyisocyanates which are blocked with known blocking agents, such as alcohols, phenols, oximes, lactams, alkanolamines, secondary amines or aromatic alcohols.

The incorporation of the crosslinked polymer microparticles employed in accordance with the invention in the electrodip paints presents no problems. The aqueous dispersions of polymer microparticles can be added to the binder dispersion, to the pigment paste or to the finished electrodip paint.

The polymer microparticles to be employed in accordance with the invention are usually incorporated in the electrodip paints in a quantity such that the proportion of polymer microparticles is 0.5 to 75% by weight, preferably 1 to 50% by weight, particularly preferably 2 to 30% by weight based on the content of cathodically depositable synthetic resin and crosslinking agent, if present.

The solids content of the electrodip paints employed in accordance with the invention is preferably 7 to 35 parts by weight, particularly preferably 12 to 25 parts by weight. The pH of the electrodip paints is between 5 and 8, preferably between 6.0 and 7.5.

The electrodip paint is brought into contact with an electrically conducting anode and with the electrically conductive substrate connected as cathode. When electric current is passed between anode and cathode a firmly adhering paint film is deposited on the cathode.

The voltage applied can be varied within a wide range, and may for example be between two and one thousand volts. However, it is typical to operate with voltages of between 50 and 500 volts. The current density is as a rule between about 10 and 100 amperes/m$^2$. The current density tends to fall away in the course of the deposition.

After deposition, the coated article is rinsed and is ready for baking.

The deposited paint films are generally baked at temperatures of 130° to 200° C. over a period of 10 to 60 minutes, preferably at 150° to 180° C. over a period of 15 to 30 minutes.

The method according to the invention can be employed for coating any desired electrically conducting substrates, but in particular for coating metals such as steel, aluminum, copper and the like.

The invention is illustrated in more detail in the following examples. All data concerning parts and percentages are by weight unless expressly stated otherwise.

1. Preparation of aqueous dispersions of the crosslinked polymer microparticles employed in accordance with the invention 1.1 Preparation of a solution of diethylenetriaminediketimine in methyl isobutyl ketone The water of reaction is removed azeotropically at 110°–140° C. from a 70 percent by weight solution of diethylenetriamine in methyl isobutyl ketone. The solution is then diluted with methyl isobutyl ketone until it has an amine equivalent weight of 129.

1.2 Preparation of Dispersion 1

1078 parts of an epoxy resin based on bisphenol A having an EEW (epoxide equivalent weight) of 188, 392 parts of bisphenol A, 150 parts of dodecylphenol and 85 parts of xylene are placed in a reaction vessel and heated to 130° C. under a nitrogen atmosphere. After a short exothermic reaction on addition of 1.6 parts of triphenylphosphine, the reaction mixture is held at 130° C. until it has an EEW of 935 (about 1.5 hours). The mixture is then cooled to 105° C. while carefully adding 172 parts of methyl isobutyl ketone. 222 parts of the diethylenetriaminediketimine solution described in section 1.1 are then added. After the heating of the reaction mixture caused by the heat of reaction has subsided, the mixture is held for another hour at 115° C. It is then diluted with 115 parts of butyl glycol and 185 parts of sec-butanol and cooled to 82° C.

1600 parts of the resulting reaction mixture at 82° C. are added with stirring without further cooling to a mixture of 1576 parts of deionized water and 27.6 parts of glacial acetic acid. The mixture is then homogenized for a further 5 minutes and diluted over 1 hour with 1333 parts of deionized water in portions. The low-boiling solvent constituents are then removed in a vacuum distillation. The resulting dispersion of crosslinked polymer microparticles has a solids content of 28.9% (1 h, 130° C.), a base content of 0.705 and an acid content of 0.462 milliequivalents per g of solids.

1.3 Preparation of Dispersion 2

715 parts of an epoxy resin based on bisphenol A having an EEW (epoxide equivalent weight) of 188, 260 parts of bisphenol A, 100 parts of dodecylphenol and 53 parts of xylene are placed in a reaction vessel and heated to 130° C. under a nitrogen atmosphere. After a short exothermic reaction on addition of 1.1 parts of triphenylphosphine, the reaction mixture is held at 130° C. until it has an EEW of 940 (about 1.5 hours). 2.1 parts of N,N-dimethylbenzylamine are then added, and the reaction mixture is held further at 130° C until an EEW of 1416 is reached. 958 parts of a polytetrahydrofuran diglycidyl ether with an EEW of 420 (Grilonit F 713, from Ems Chemie) are then added together with 29 parts of butyl glycol, and the mixture is cooled to 105° C. 281 parts of the diethylenetriaminediketimine solution described in section 1.1 are then added and the mixture is held for a further hour at 115° C. The reaction mixture is then cooled to 88° C.

1273 parts of the resulting reaction mixture at 88° C. are added with stirring without further cooling to a mixture of 953 parts of deionized water and 31.2 parts of glacial acetic acid. The mixture is then homogenized for a further 5 minutes and diluted over 1 hour with 3965 parts of deionized water in portions. The low-boiling solvent constituents are then removed in a vacuum distillation. The resulting dispersion of crosslinked polymer microparticles has a solids content of 19% (1 h, 130° C.), a base content of 0.818 and an acid content of 0.245 milliequivalents per g of solids.

2. Preparation of crosslinking agents 2.1 Crosslinking agent 1

1.133 g of toluylene diisocyanate (mixture of approximately 80% of the 2,4- and 20% of the 2,6-isomer) and 356 g of methyl isobutyl ketone are placed under a nitrogen atmosphere in a reactor fitted with a stirrer, reflux condenser, internal thermometer and inert gas inlet. 0.7 g of dibutyltin dilaurate is added, and 290 g of trimethylolpropane are added over 4 hours at equal intervals in the form of small portions. Cooling is controlled so that the temperature of the reaction mixture does not exceed 45° C.

30 min after adding the final portion of trimethylolpropane, an NCO equivalent weight of 217 is measured (based on solids). 722 g of n-propylglycol are then added dropwise over an hour with further cooling. At the end of the addition the temperature has risen to 86° C. The mixture is then heated to 100° C. and allowed to react for a further hour. In a subsequent check no remaining NCO groups can be detected. The batch is then cooled and diluted with 500 g of methyl isobutyl ketone. The solution of this polyurethane crosslinking agent has a solids content of 69.8% (measured after 1 hour at 130° C.).

2.2 Crosslinking agent 2

In a reactor as described in the preceding example, 1,146 g of trimerized hexamethylene diisocyanate with an NCO equivalent weight of 191 ("Basonat PLR 8638", from BASF) and 339 g of methyl isobutyl ketone are heated with stirring to 50° C. under a nitrogen atmosphere. 774 g of di-n-butylamine are then added dropwise over 4 hours. The temperature during addition is held below 55° C. by cooling. The solution of crosslinking agent is then cooled and diluted with a further 141 g of methyl isobutyl ketone. The solids content is 79.5% (measured after 1 hour at 130° C.).

3. Preparation of a binder dispersion

In a reactor, 1698 parts of epoxy resin based on bisphenol A having an EEW of 490 are heated to 105° C. together with 227 parts of dodecylphenol and 101 parts of xylene under a nitrogen atmosphere. As soon as the melt is clear, traces of residual water are removed using a water separator by azeotropic reflux distillation under vacuum in the course of 20 min. The mixture is then heated to 130° C. and 3 parts of N,N-dimethylbenzylamine are added. The mixture is held at this temperature until the EEW has reached a value of 1100. 126 parts of butyl glycol, 127 parts of diethanolamine and 223 parts of xylene are then added, and the mixture is cooled to 90° C. One hour later it is diluted with 125 parts of propylene glycol phenyl ether and 317 parts of isobutanol and cooled to 60° C. 40 parts of N,N-dimethylaminopropylamine are then added, the mixture is heated to 90° C. and held at this temperature for 2 hours It is then cooled to 70° C. and 280 parts of Plastilit 3060 (polypropylene glycol compound, from BASF), 805 parts of crosslinking agent (section 2.1) and 704 parts of crosslinking agent (cf. section 2.2) are added, the mixture is homogenized for 20 min, and the resin mixture is transferred to a dispersion vessel. In this vessel 91.7 parts of lactic acid (88% strength) are added and the mixture is diluted with 2112 parts of deionized water in portions with stirring. It is then homogenized for 20 min before being further diluted with an additional 3000 parts of deionized water in small portions.

The volatile solvents are removed by distillation under vacuum and are then replaced by an equal volume of deionized water. The dispersion has the following characteristic values:
Solids content: 35% (1 hour at 130° C.)
Base content: 0.570 milliequivalents/g of solids
Acid content: 0.226 ""
pH: 6.2

4. Preparation of a gray pigment paste 27.81 parts of bisphenol A diglycidyl ether, 1.44 parts of xylene and 5.81 parts of bisphenol A are reacted in the presence of 0.002 parts of triphenylphosphine at 150°–160° C. to an EEW of 345. The batch is then diluted with 21.61 parts of butyl glycol and cooled to 49° C. A mixture of 7.77 parts of 9-amino-3,6-dioxanonan-1-ol and 4.07 parts of N,N-dimethylaminopropylamine is then added over 6 min, whereupon the temperature rises to 110° C. The mixture is held for one hour at between 110° and 115° C. before 6.45 parts of butyl glycol are added and the batch is cooled to 77° C. 14.9 parts of nonylphenol glycidyl ether are then added. The temperature subsequently rises to 90° C. and is held there for one hour, before the mixture is diluted with 10.03 parts of butyl glycol and cooled. The solids content of the highly fluid resin solution is 60%.

To prepare the pigment paste, initially 29.33 parts of water, 1.59 parts of acetic acid (90% strength) and 21.60 parts of the above-described resin solution are premixed. Then 0.7 parts of antifoam[1]), 0.5 parts of carbon black, 4.8 parts of basic lead pigment, 6.75 parts of extender HEWP[2]), 32.48 parts of titanium dioxide (R 900) and 2.25 parts of dibutyltin oxide are added, and the mixture is predispersed for 30 min in a dissolver-stirrer running at high speed. The mixture is then dispersed in a small-scale laboratory mill (Motor Mini Mill, Eiger Engineering Ltd. Great Britain) for 1 to 1.5 hours to a Hegmann fineness of less than/equal to 12, and adjusted with further water to processing viscosity. The result is a pigment paste which is very stable to separation.

1) "Tristar Antifoam" Tristar Chemical Co. Dallas, USA
2) English China Clay Int. Great Britain 5. Formulation of electrodip paints and deposition of paint films 1925 parts of the binder dispersion according to section 3 are diluted with 2500 parts of deionized water and 3 parts of 10% strength acetic acid. 572 parts of the pigment paste according to section 4 are added to the binder dispersion thus diluted, as are the amounts of polymer microparticle dispersion 1 or 2 (cf. section 1.2 and 1.3) given in the following table.

| Electrodip paint | Added polymer microparticle dispersion according to section | Amount |
|---|---|---|
| 1 | 1.2 | 173 |
| 2 | 1.2 | 346 |
| 3 | 1.3 | 526 |
| 4 (Comparison) | — | — |

The electrodip paints are left to age with stirring for 5 days at room temperature. The deposition of the paint films takes place over 2 min at the given voltage onto cathodically connected steel test panels. The bath temperature in this procedure is held at 27° C. The wet films deposited are rinsed with deionized water and baked for 20 min at 165° C. The resulting paint films are tested and the test results are collated in the following table:

|  | Electrodip paints | | | |
|---|---|---|---|---|
|  | 1 | 2 | 3 | 4 |
| Voltage | 320 | 350 | 380 | 300 |
| Layer thickness (μm) | 21 | 19 | 20 | 23 |
| 360 hour salt spray test in accordance with ASTM B 117 | | | | |
| Disbonding (mm) | 0.8 | 0.5 | 0.3 | 1 |
| Surface corrosion[1] | 1 | 0 | 1 | 2 |
| Edge corrosion[1] | 0–1 | 0 | 0 | 4 |
| Electrical quality (%)[2] | 85 | 95 | 98 | 4 |
| Sand abrasion according to specification No. 4100 of Adam Opel AG (1/μm)[3] | 1.4 | 1.8 | 1.6 | 1.0 |

[1] 0 = best value, 5 = worst value
[2] This figure is obtained by applying a voltage of 50–1000 V to the coated edge and determining the insulation effect to electric current. The higher the electrical quality, the higher the insulation effect. The higher the insulation effect, the better the edge is coated by an electrodip paint film.
[3] The higher the value, the higher the ability of the paint film to resist sand abrasion.

The test results set out above show that electrodip paints containing the polymer microparticles employed in accordance with the invention can be used to produce paint films which not only provide better covering of the edges of the coated substrate but which also, surprisingly, exhibit an improved corrosion protection effect and an improved ability to resist sand abrasion.

We claim:

1. Method of coating electrically conductive substrates comprising the steps of
(1) immersing the electrically conductive substrate in an aqueous electrodip paint which contains at least one cathodically depositable synthetic resin together with crosslinked polymer microparticles,
(2) connecting the substrate as cathode,
(3) depositing a film by direct current on the substrate,
(4) removing the coated substrate from the electrodip paint, and
(5) baking the deposited paint film,
wherein the crosslinked polymer microparticles contained in the aqueous electrodip paint are prepared by reacting
(A) a compound which contains on average more than 1.0 epoxide group per molecule, or a mixture of such compounds, with
(B) a compound which contains a group reactive toward epoxide groups and at least one ketimine or aldimine group in the molecule, or a mixture of such compounds to give a noncrosslinked intermediate product (C), which contains on average at least one epoxide group per molecule, and dispersing the intermediate product in the presence of a Brönsted acid in an aqueous medium, and subsequently reacting the epoxide groups on the intermediate product (C) with the amino groups on the ketimine to form crosslinked particles.

2. Method according to claim 1, characterized in that component (A) contains on average 1.5 to 3.0 epoxide groups per molecule.

3. Method according to claim 1, characterized in that component (B) is a compound which contains both a secondary amino group and at least one ketimine group in the molecule.

4. Method according to claim 1, characterized in that the noncrosslinked intermediate product (C) contains on average 1.0 to 4.0 epoxide groups.

5. Method according to claim 1, characterized in that the noncrosslinked intermediate product (C) contains on average 1.0 to 2.0 epoxide groups.

6. Process for the preparation of an aqueous dispersion of crosslinked polymer microparticles, comprising the steps of reacting
(A) a compound which contains on average more than 1.0 epoxide group per molecule, or a mixture of such compounds, with
(B) a compound which contains both a group which is reactive toward epoxide groups and at least one ketimine or aldimine group in the molecule, or a mixture of such compounds,
to give a noncrosslinked intermediate product (C) which contains on average at least one epoxide group per molecule, and dispersing the intermediate product in an aqueous medium in the presence of a Brönsted acid, and subsequently reacting the epoxide group with the amino group(s) on the ketimine to form crosslinked particles.

7. Process according to claim 6, characterized in that component (A) contains on average 1.5 to 3.0 epoxide groups per molecule.

8. Process according to claim 6, characterized in that component (B) contains both a secondary amino group and at least one ketimine group in the molecule.

9. Process according to claim 6, characterized in that the noncrosslinked intermediate product (C) contains on average 1.0 to 4.0 epoxide groups per molecule.

10. Process according to claim 6, characterized in that the noncrosslinked intermediate product (C) contains on average 1.0 to 2.0 epoxide groups per molecule.

11. Aqueous dispersions of crosslinked polymer microparticles, characterized in that they are prepared according to claim 6.

12. Aqueous electrodip paints, containing at least one cathodically depositable synthetic resin together with crosslinked polymer microparticles, wherein the crosslinked polymer microparticles are prepared by reacting
(A) a compound which contains on average more than 1.0 epoxide group per molecule, or a mixture of such compounds, with (B) a compound which contains a group reactive toward epoxide groups and at least one ketimine or aldimine group in the molecule, or a mixture of such compounds to give a noncrosslinked intermediate product (C), which contains on average at least one epoxide group per molecule, and dispersing the intermediate product in the presence of a Brönsted acid in an aqueous medium, and subsequently reacting the epoxy groups on the intermediate product (C) with the amine groups on the ketimine to form crosslinked particles.

13. Electrodip paints according to claim 12, characterized in that component (A) contains on average 1.5 to 3.0 epoxide groups per molecule.

14. Electrodip paints according to claim 12, characterized in that component (B) is a compound which contains both a secondary amino group and at least one ketimine group in the molecule.

15. Electrodip paints according to claim 12, characterized in that the noncrosslinked intermediate product (C) contains on average 1.0 to 4.0 epoxide groups.

16. Electrodip paints according to claim 12, characterized in that the noncrosslinked intermediate product (C) contains on average 1.0 to 2.0 epoxide groups.

* * * * *